US010056729B2

(12) United States Patent
Kirst et al.

(10) Patent No.: US 10,056,729 B2
(45) Date of Patent: Aug. 21, 2018

(54) TWO REEL TERMINAL CART

(71) Applicant: Artos Engineering Company, Brookfield, WI (US)

(72) Inventors: Michael A. Kirst, Pewaukee, WI (US); Rich Schwartz, Hartland, WI (US)

(73) Assignee: Artos Engineering Company, Brookfield, WI (US)

( * ) Notice: Subject to any disclaimer, the term of this patent is extended or adjusted under 35 U.S.C. 154(b) by 238 days.

(21) Appl. No.: 15/153,957

(22) Filed: May 13, 2016

(65) Prior Publication Data

US 2016/0336705 A1 Nov. 17, 2016

Related U.S. Application Data

(60) Provisional application No. 62/161,949, filed on May 15, 2015.

(51) Int. Cl.
*B23P 19/00* (2006.01)
*H01R 43/042* (2006.01)
*H01R 43/055* (2006.01)

(52) U.S. Cl.
CPC ...... *H01R 43/055* (2013.01); *Y10T 29/53235* (2015.01); *Y10T 29/53261* (2015.01)

(58) Field of Classification Search
CPC ............. B65H 75/403; Y10T 137/6932; Y10T 29/5193; Y10T 29/53213; Y10T 29/53235; Y10T 29/53261; Y10T 29/53265
USPC ....... 29/753, 33 M, 748, 754, 759, 760, 861, 29/863
See application file for complete search history.

(56) References Cited

U.S. PATENT DOCUMENTS

| | | | |
|---|---|---|---|
| 4,290,179 | A | 9/1981 | Bakermans et al. |
| 4,363,167 | A | 12/1982 | Boutcher et al. |
| 4,581,796 | A | 4/1986 | Fukuda et al. |
| 5,078,001 | A | 1/1992 | Bakermans |
| 5,127,159 | A | 7/1992 | Kudo et al. |
| 5,765,278 | A | 6/1998 | Koike et al. |

(Continued)

FOREIGN PATENT DOCUMENTS

| | | |
|---|---|---|
| EP | 1667289 | 6/2006 |
| EP | 2738886 | 6/2014 |

OTHER PUBLICATIONS

International Preliminary Report on Patentability and Written Opinion for International Application No. PCT/US2016/032299 dated Nov. 21, 2017.

(Continued)

*Primary Examiner* — Thiem Phan
(74) *Attorney, Agent, or Firm* — Andrus Intellectual Property Law, LLP

(57) ABSTRACT

A terminal reel cart that supports two reels of terminals and two terminal applicators such that the terminal applicators can be loaded with the strip of terminals and moved into position relative to a terminal station of a wire processing system. The terminal reel cart supports the reels of terminals and the terminal applicators. The reel cart includes a plurality of wheels that allow the cart to be easily moved throughout a processing facility. The reel cart includes a pair of paper take up reels that are each driven by a motor and collects the paper backing from the strip of terminals. The paper take up reels are driven by a drive motor on the wire processing system.

8 Claims, 11 Drawing Sheets

(56) References Cited

U.S. PATENT DOCUMENTS

| | | | | |
|---|---|---|---|---|
| 8,157,201 | B2 * | 4/2012 | Galgano | B62B 1/14<br>242/557 |
| 8,176,626 | B2 | 5/2012 | Kirst | |
| 9,373,924 | B2 * | 6/2016 | Fischer | H01R 43/055 |
| 2004/0007041 | A1 | 1/2004 | Imgrut et al. | |
| 2004/0007042 | A1 | 1/2004 | Imgrut et al. | |
| 2004/0069400 | A1 | 4/2004 | Onoshiro et al. | |
| 2006/0032272 | A1 | 2/2006 | Hamilton | |
| 2010/0293780 | A1 | 11/2010 | Kirst | |
| 2014/0150260 | A1 | 6/2014 | Fischer | |

OTHER PUBLICATIONS

International Search Report and Written Opinion for International Application No. PCT/US2016/032299 dated Aug. 12, 2016.

* cited by examiner

TWO REEL TERMINAL CART

CROSS REFERENCE TO RELATED APPLICATIONS

This application claims the benefit of U.S. Provisional Application No. 62/161,949, filed May 15, 2015.

BACKGROUND OF THE INVENTION

The present disclosure generally relates to a reel cart for use with a wire processing system. More specifically, this disclosure relates to a terminal reel cart that allows two separate terminal applicators to be positioned on the reel cart, each loaded with a separate strip of terminals and positioned for use with the wire processing system. The two terminal reels and two applicators allow a new terminal reel and the terminal applicator to be loaded on the cart while the other terminal applicator and terminal reel are being used by the wire processing system.

Presently, many different types of terminal applicators can be used with a wire processing system. When different terminals are to be crimped onto the ends of the wire being processed, the terminal applicator is removed from the wire processing system and another terminal applicator is installed. In many wire processing facilities, there are two or more terminal applicators that are used on the wire processing machine, for each end of the wire.

When a new applicator is installed, a strip of terminals must be fed through a terminal guide and the applicator from a supply reel. The supply reel is typically mounted directly to the machine. This requires the operator to mount the terminal reel to the machine, mount the applicator and feed the terminal strip through the guide and the applicator, which requires down time of the wire processing machine.

SUMMARY OF THE INVENTION

The present disclosure relates to a terminal reel cart mounted on a series of caster wheels that can be moved about a manufacturing facility and used with one or more wire processing systems. The terminal reel cart includes two separate and independent terminal reels, each mounted to a support shaft. The support shafts are supported on a support body of the terminal reel cart.

The terminal reel cart includes a pair of terminal applicator holders, each configured to receive and retain a terminal applicator. When each terminal applicator is supported on a terminal applicator holder of the terminal reel cart, the continuous strip of terminals can be fed through the terminal applicator from the terminal reel supported by the terminal reel cart. The strip of terminals passes through a guide attached to the terminal reel cart. When a strip of terminals is installed into the terminal applicator, the entire terminal reel cart can be moved as a unit to a desired wire processing system during changeover of the terminal applicators. Since the strip of terminals is already installed into the terminal applicator, the terminal applicator can be removed from the terminal applicator holder and installed into terminal station of the wire processing system without having to thread the strip of terminals through the terminal applicator. A second reel of terminals is also supported on the terminal cart and threaded through the second terminal applicator.

In one embodiment of the disclosure, each of the terminal applicator holders includes a magnet to magnetically hold a terminal applicator in place. Other types of holding devices are contemplated as being within the scope of the present disclosure.

The terminal guide included on the terminal reel cart is pivotally mounted such that the terminal guide can guide the strip of terminals as the applicator is moved from the terminal applicator holder to installation within the wire processing system. The terminal guide includes a switch connected to the wire processing system to provide a signal indicating whether the strip of terminals is passing through the guide. When the strip of terminals is missing, the system determines that the terminal reel needs to be replaced.

The terminal reel cart includes a paper take-up reel associated with each of the terminal reels. The paper take-up reel accumulates the paper separating from the strips of terminals. In one embodiment, the paper take-up reel is supported along a drive shaft. The drive shaft is rotatably coupled to a drive wheel through a clutch assembly. Rotation of the drive wheel causes rotation of the center spool of the paper take up reel.

When the terminal reel cart is installed at the wire processing system, the drive wheel of the terminal reel cart frictionally engages a drive wheel coupled to a drive motor of the wire processing system. The frictional interaction between the drive wheel of the wire processing system and the drive wheel of the terminal reel cart allows the wire processing system to control the operation of the paper take up reel. Alternatively, the drive wheel of the wire processing system and the drive wheel of the terminal reel cart may engage in a non-frictional interaction, such as by gears. As another alternative, a separate drive motor could be included on the terminal reel cart.

The two separate terminal reels and terminal applicators allows the terminal cart to be positioned in the wire processing system with the inside terminal reel and applicator being used by the wire processing system. In this positon and while the wire processing system is operation, the outside terminal reel and associated terminal applicator can be loaded without interrupting operation of the wire processing system. When it is desired to change the terminal applicator, the reel cart can be rotated 180 degrees and the terminal applicator and terminal reel on the opposite side of the cart are installed into the wire processing system.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
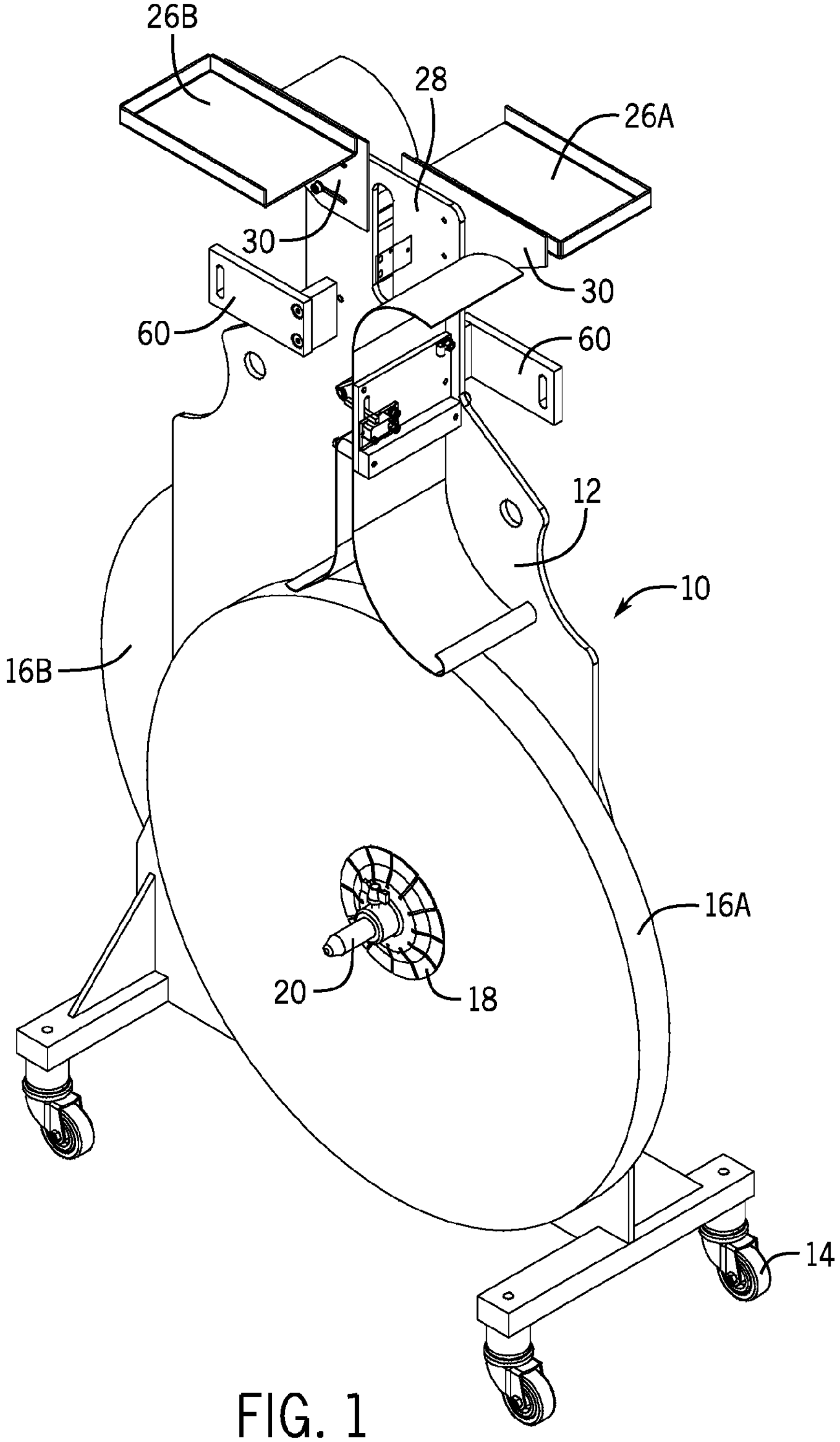
FIG. 1 is a front perspective view of a terminal reel cart that is used to support two reels of terminals and two terminal applicators.

FIG. 1 illustrates a terminal reel cart 10 constructed in accordance with the present disclosure. The terminal reel cart 10 includes a support body 12 mounted to a series of caster wheels 14. The caster wheels 14 allow the entire terminal reel cart 10 to be moved to a desired location in a working environment.

The terminal reel cart 10 supports a first terminal reel 16A and a second terminal reel 16B that each include a continuous strip of terminal 2 wound thereon. Each of the terminal reels 16A, 16B is positioned between a pair of support plates 18 and is rotatably mounted to a shaft 20 that is supported along one of a first face surface 22A and a second face surface 22B of the support body 12, as shown in FIG. 3.

As illustrated in FIG. 1, the support body 12 supports a first terminal applicator holder 26A and a second terminal applicator holder 26B that are each mounted near the top end 28 of the support body 12 by a generally vertical support bracket 30. The terminal applicator holders 26A, 26B are shown in the Figures to be mounted on an opposite side of the support body 12, but could alternatively be mounted on the same side. The terminal applicator holders 26A, 26B of the present disclosure are configured to receive any number of different types of terminal applicators 6 (shown in FIG. 10). Similarly, the terminal applicator holder 26A, 26B can also be of various different configurations, such as a tray (FIG. 1) or a magnetic holder (FIG. 12), or an applicator baseplate, for example.

Figure 3:
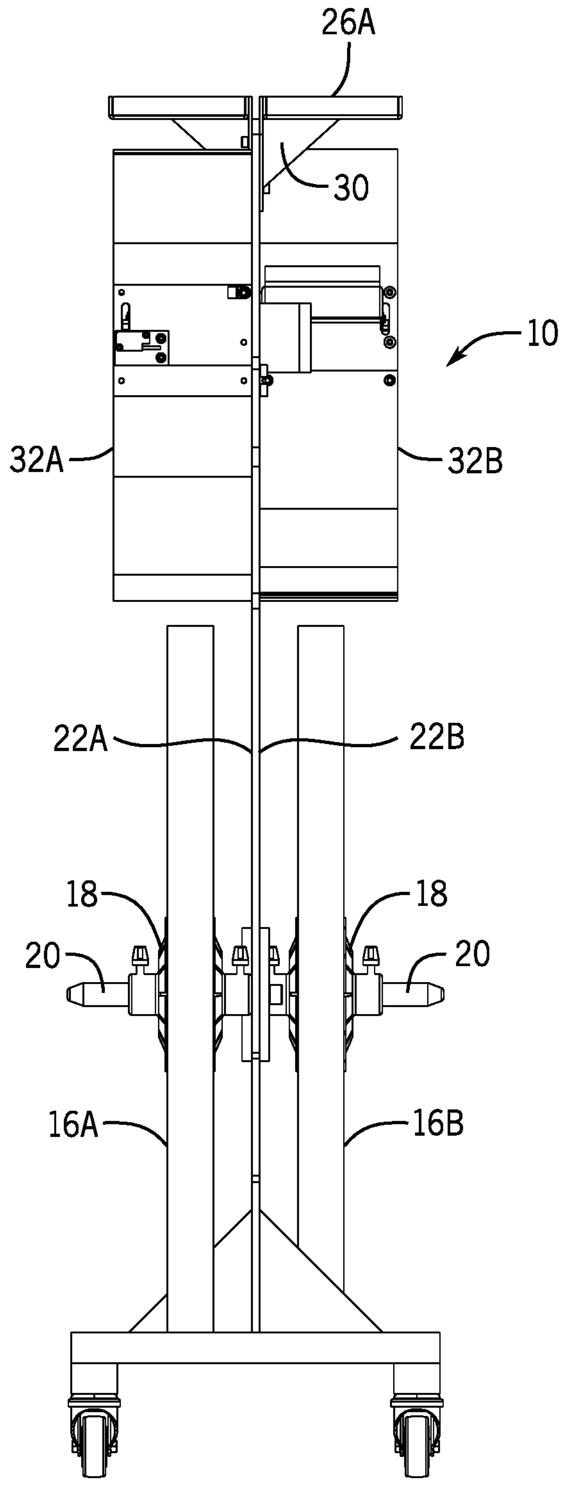
FIG. 3 is a front view of the terminal reel cart.
Figure 4:
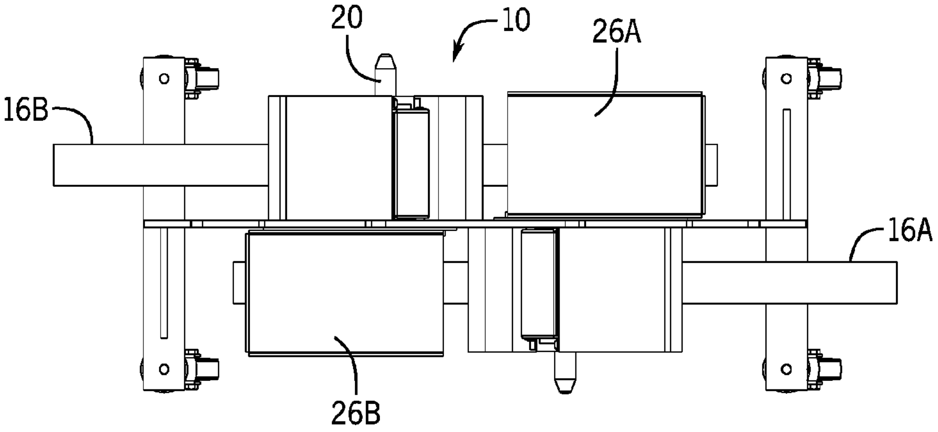
FIG. 4 is a top view of the terminal reel cart.
Figure 5:
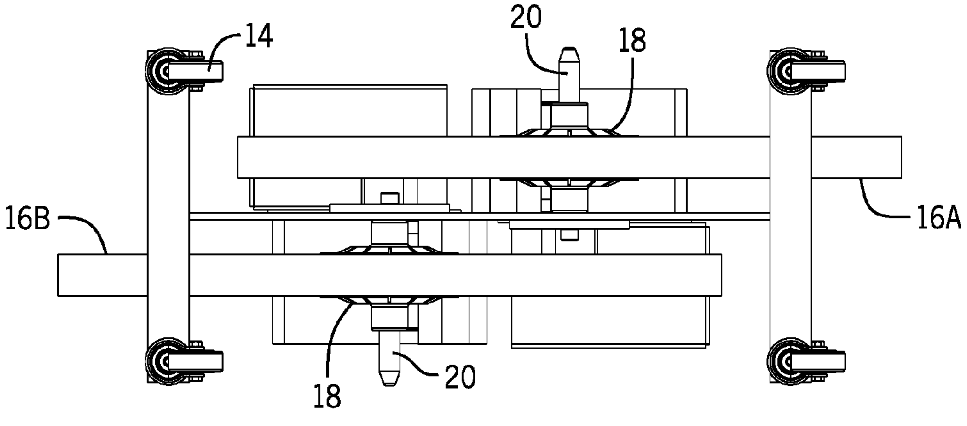
FIG. 5 is a bottom view of the terminal reel cart.
Figure 6:
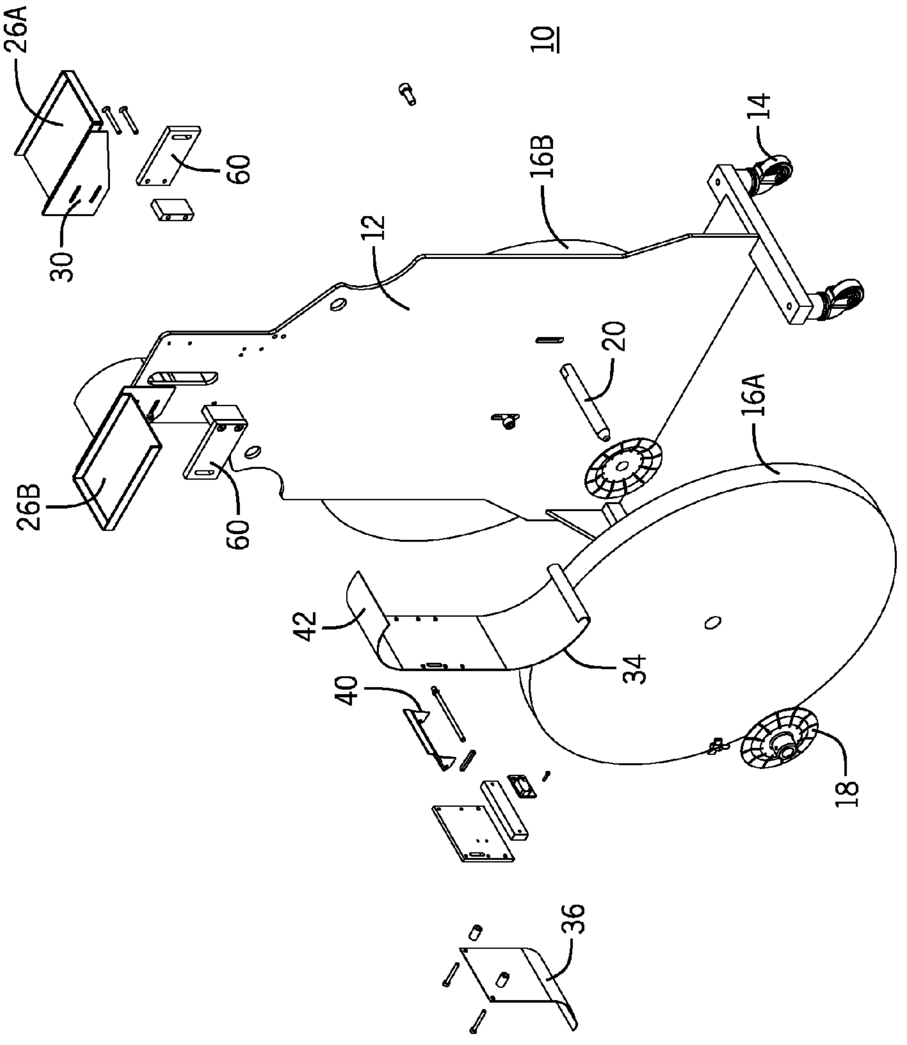
FIG. 6 is an exploded perspective view of the terminal reel cart.
Figure 10:
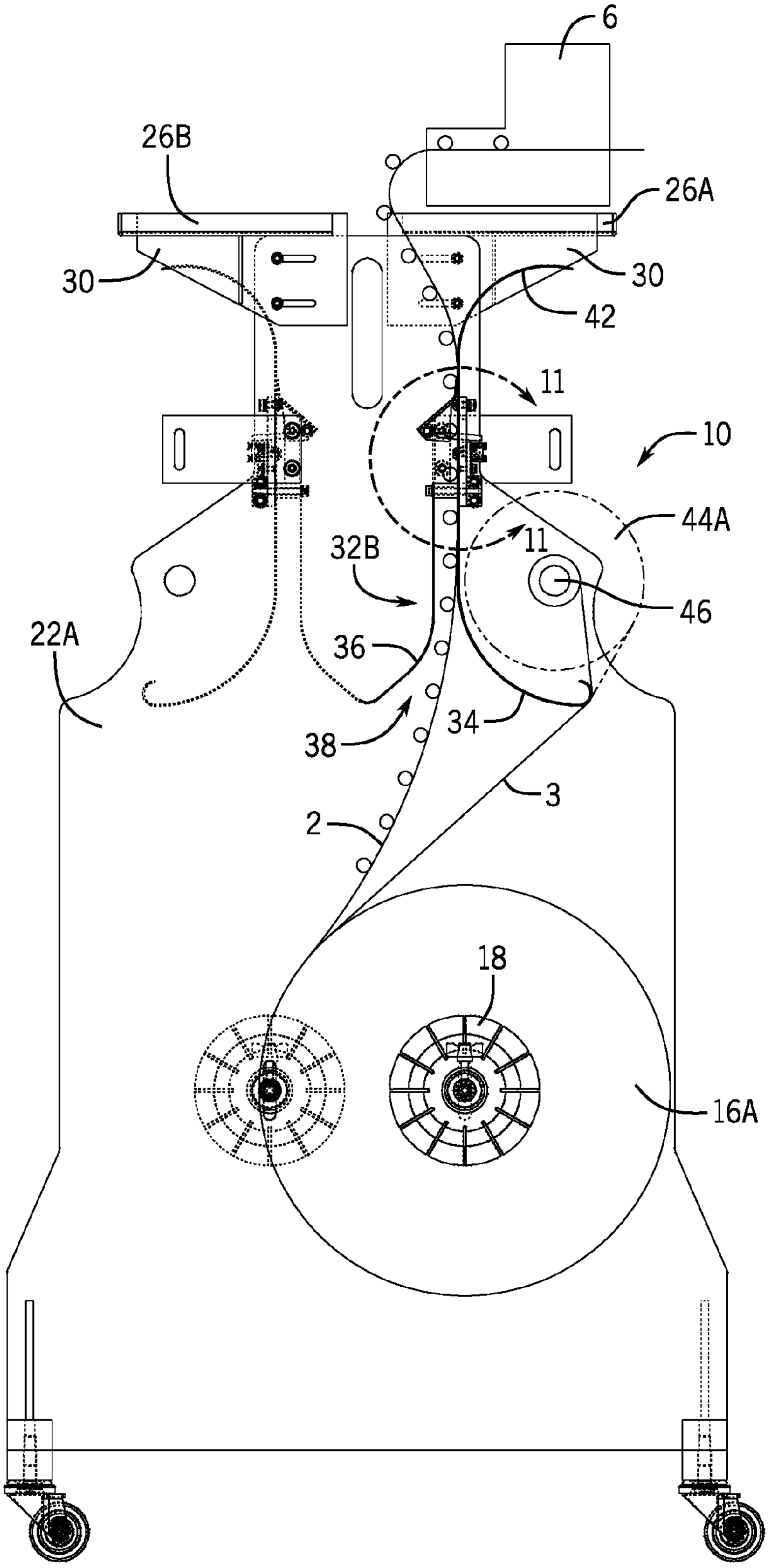
FIG. 10 is a side view of the terminal reel cart of FIG. 2.
Figure 11:
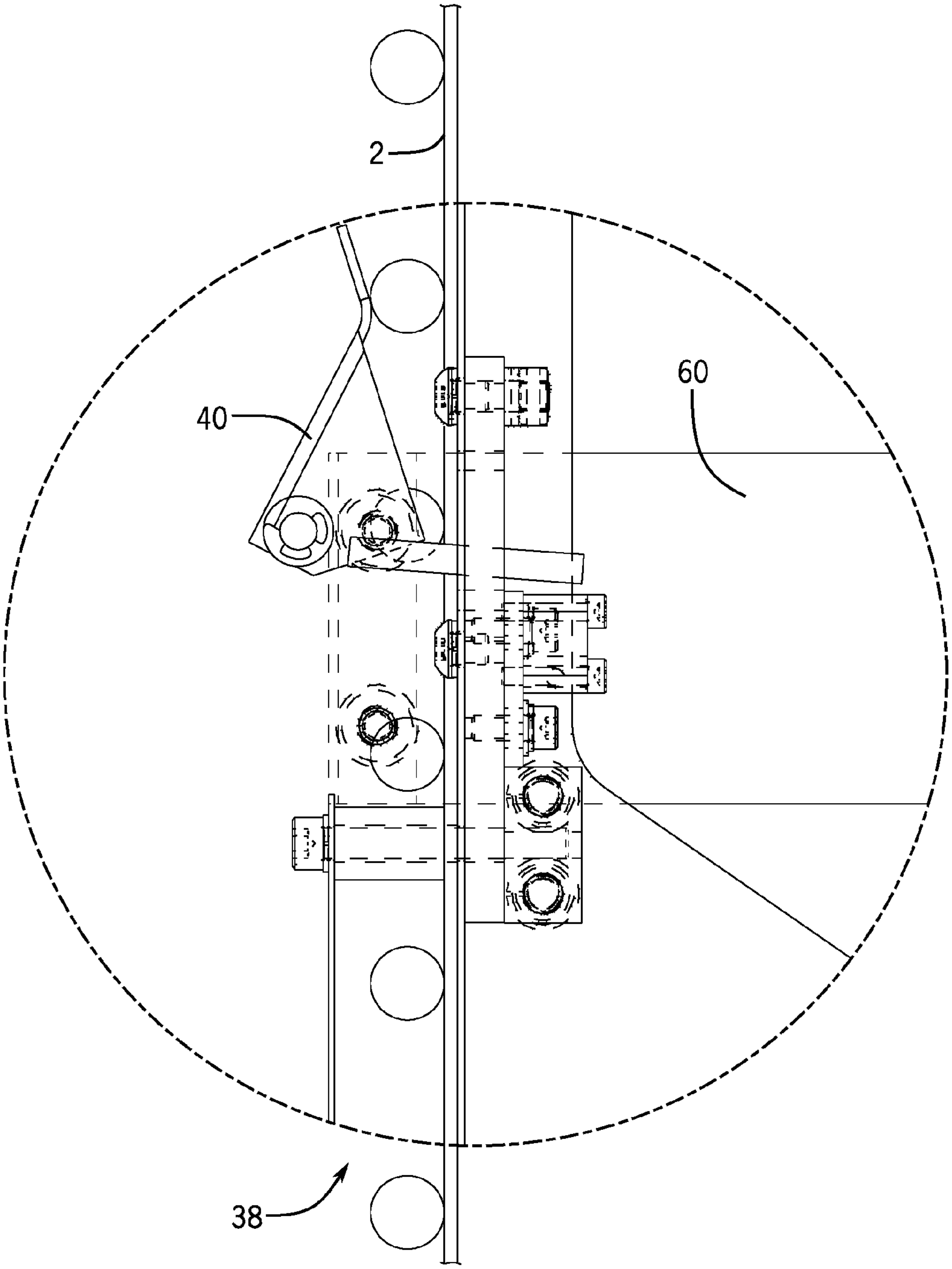
FIG. 11 is a magnified, partial section view taken along 11 of FIG. 10.

Referring to FIGS. 3 and 10, the terminal reel cart 10 includes a first terminal guide 32A and a second terminal guide 32B that each guide a strip of terminals from one of the terminal reels 16A, 16B to one of the terminal applicators supported on the terminal applicator holder 26A, 26B. The terminal guides 32A, 32B each include an inner guide member 34 and an outer guide member 36 that combine to define an inlet 38 that receives the strip of terminals 2 from one of the terminal reels 16A, 16B. The strip of terminals 2 is fed through the inlet 38 and passes through a terminal chute 40 before passing over an upper curved portion 42 and into the terminal applicator 6. It is contemplated that the inner guide member 34 or the outer guide member 36 could be eliminated in some embodiments of the terminal reel cart 10.

When a terminal applicator 6 is supported on a terminal applicator holder 26A, 26B, the strip of terminals 2 passes through the terminal chute 40 such that the strip of terminals 2 can be loaded into the terminal applicator 6 when the terminal applicator is supported on the terminal applicator holder 26A, 26B. When the terminal applicator 6 is removed from the terminal applicator holder 26A, 26B and installed into the wire processing system, as will be described, the strip of terminals 2 may remain supported after the terminal applicator is positioned in its desired location.

It should be recognized that while the Figures generally depict the terminal chute 40 as pivoting away from each respective face surface 22A, 22B when a strip of terminals 2 is loaded therein, alternative configurations to accommodate the strip of terminals 2 would be readily recognized in the art.

It should also be recognized that while the Figures generally depict the terminal applicator holder 26A, 26B being positioned on the opposite face surface 22A, 22B as compared to the terminal reel 16A, 16B, terminal guide 32A, 32B, and paper take-up reel 44A,44B, the terminal applicator holder may also be positioned on the same face surface as the terminal reel, terminal guide and paper take-up reel.

Figure 8:
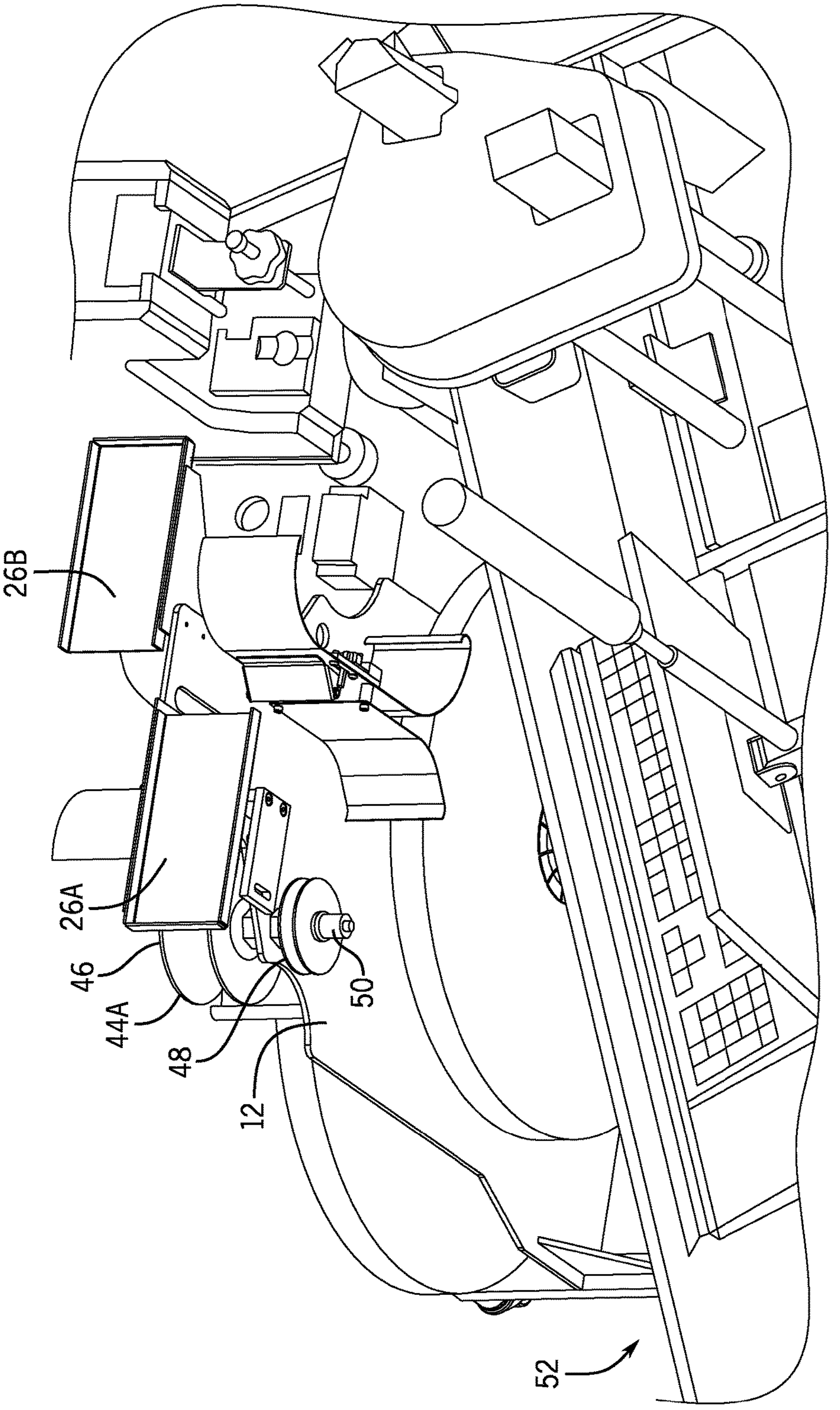
FIG. 8 is a top view showing the reel cart positioned within the wire processing system.

As illustrated in FIG. 10, the terminal reel cart 10 includes a first paper take-up reel 44A and a second paper take-up reel 44B (not shown). Since the strip of terminals 2 often includes a paper separator strip 3, the paper take-up reels 44A, 44B receive this paper separator strip 3 and collects it for later disposal. The paper take-up reels 44A, 44B are each supported about a shaft 46 that extends through the support body 12, as best shown in FIG. 8. Each shaft 46 extends through a drive wheel 48 and receives a locking collar 50 of a clutch mechanism. The clutch mechanism includes a spring member and a support plate that rotatably connects the shaft 46 and drive wheel 48, while also allowing for slippage between the two mechanisms when required. Further details of the paper take-up reel and clutch is shown in U.S. Pat. No. 8,176,626, which is incorporated herein by reference.

Figure 9:
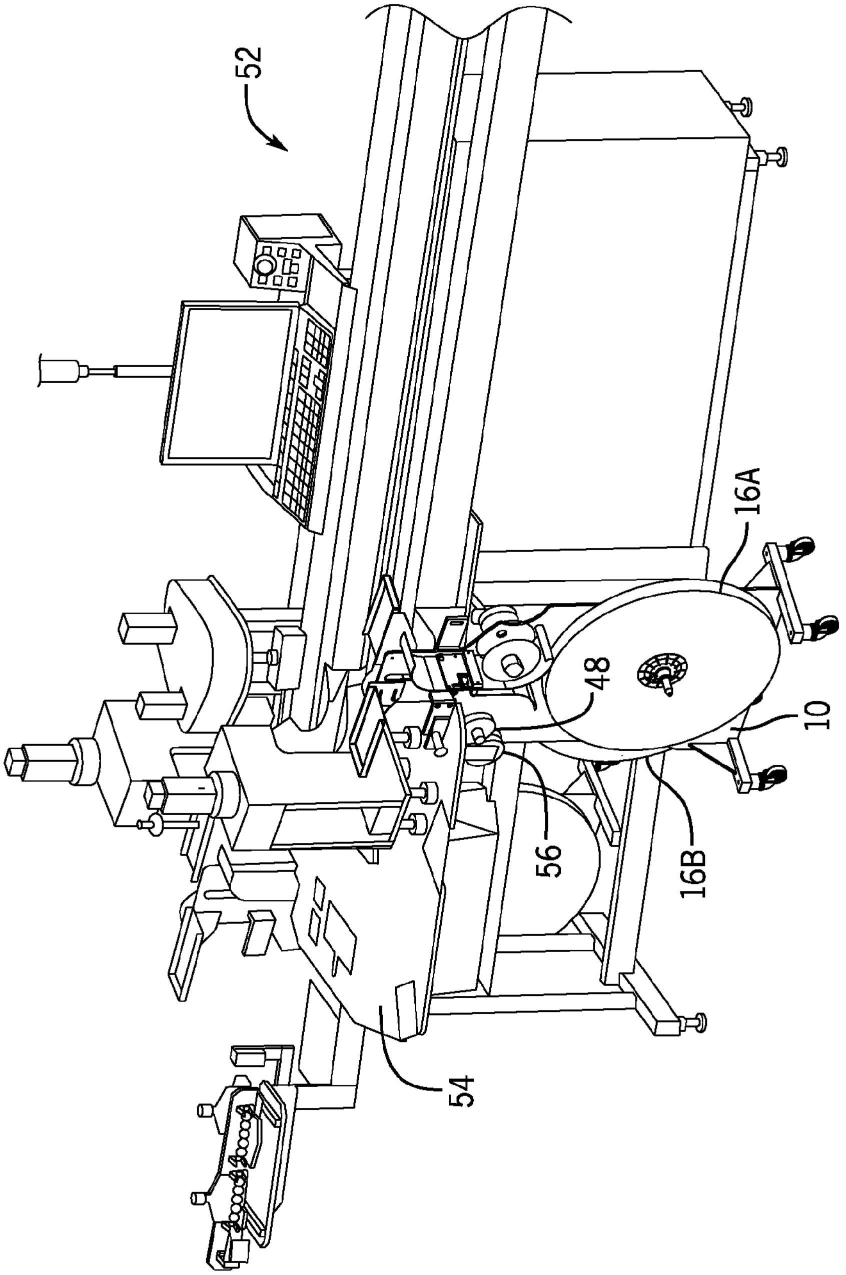
FIG. 9 is a perspective view showing another illustration of the terminal reel cart positioned within the wire processing system.

As illustrated in FIG. 9, the wire processing system 52 includes a support table 54 that supports the various wire processing equipment used to apply terminals to strips of wire or other processing equipment. A drive motor mounted beneath the support table 54 drives the drive wheel 56 and in turn engages the drive wheel 48 of the terminal reel cart 10. Rotation of the drive wheel 48 causes rotation of the paper take-up reels 44A, 44B to accumulate the paper backing strip 3 from the strip of terminals 2. Alternatively, a separate drive motor could be included on the terminal reel cart 10 to cause rotation of the paper take-up reels 44A, 44B to collect the paper backing strip 3.

As illustrated in FIG. 9, when one of the terminal reels 16A, 16B is being utilized, the other terminal reel is positioned outside of or away from the wire processing system 52. As a result of the presently disclosed configuration, the terminal reel 16A, 16B that faces away from the wire processing system 52 (16A in FIG. 9) can be removed, replaced, and threaded while the other terminal reel (16B in FIG. 9) is being utilized by the wire processing system 52, uninterrupted. The two-reel terminal cart of the present disclosure thus allows for simultaneous use and loading of the terminal reel cart 10 at any time. This may pertain to loading and using two different types of terminals and terminal applicators, or redundant types of terminals and terminal applicators, all contained on and supported by the terminal reel cart 10.

Figure 2:
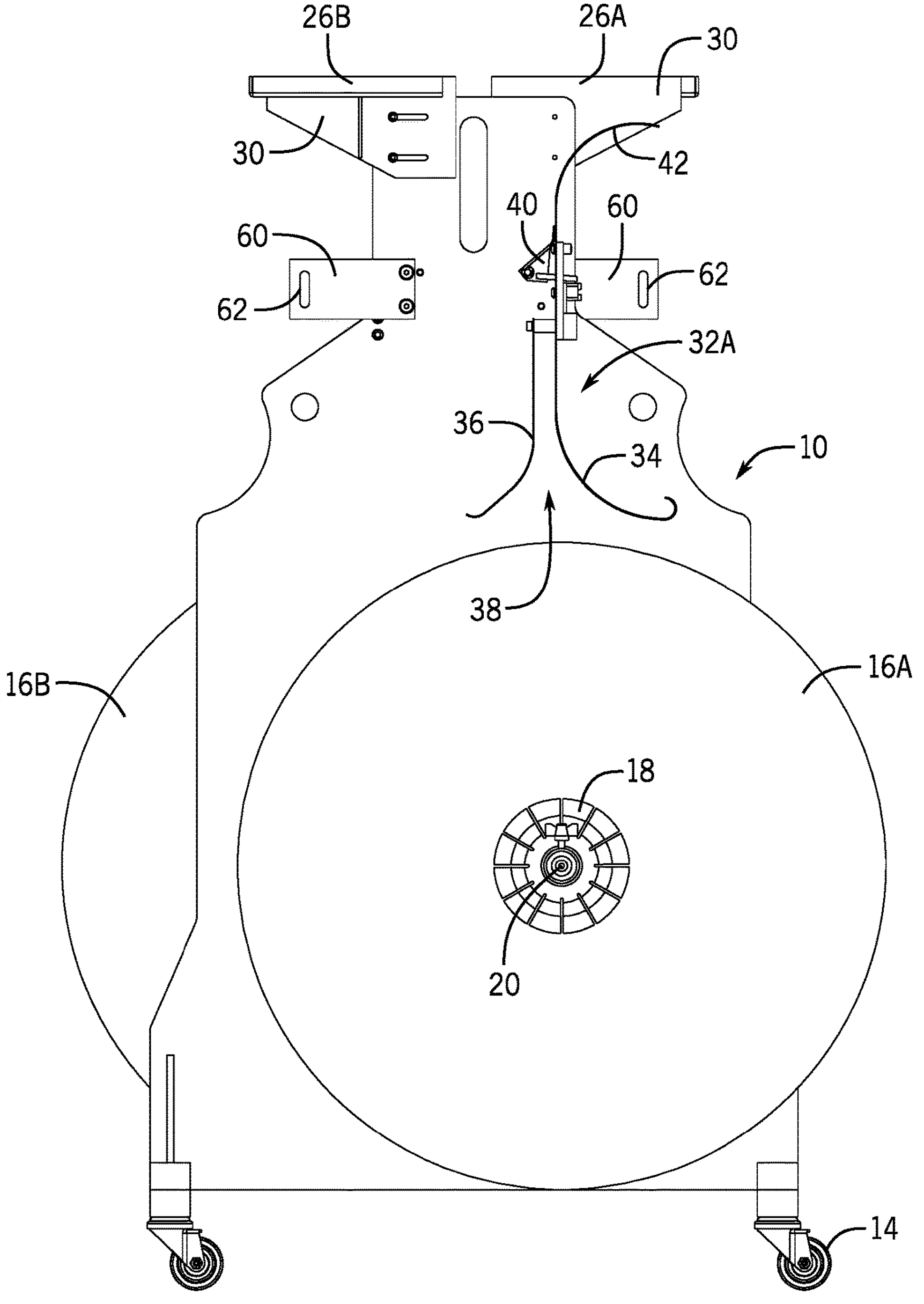
FIG. 2 is a side view of the terminal reel cart.
Figure 7:
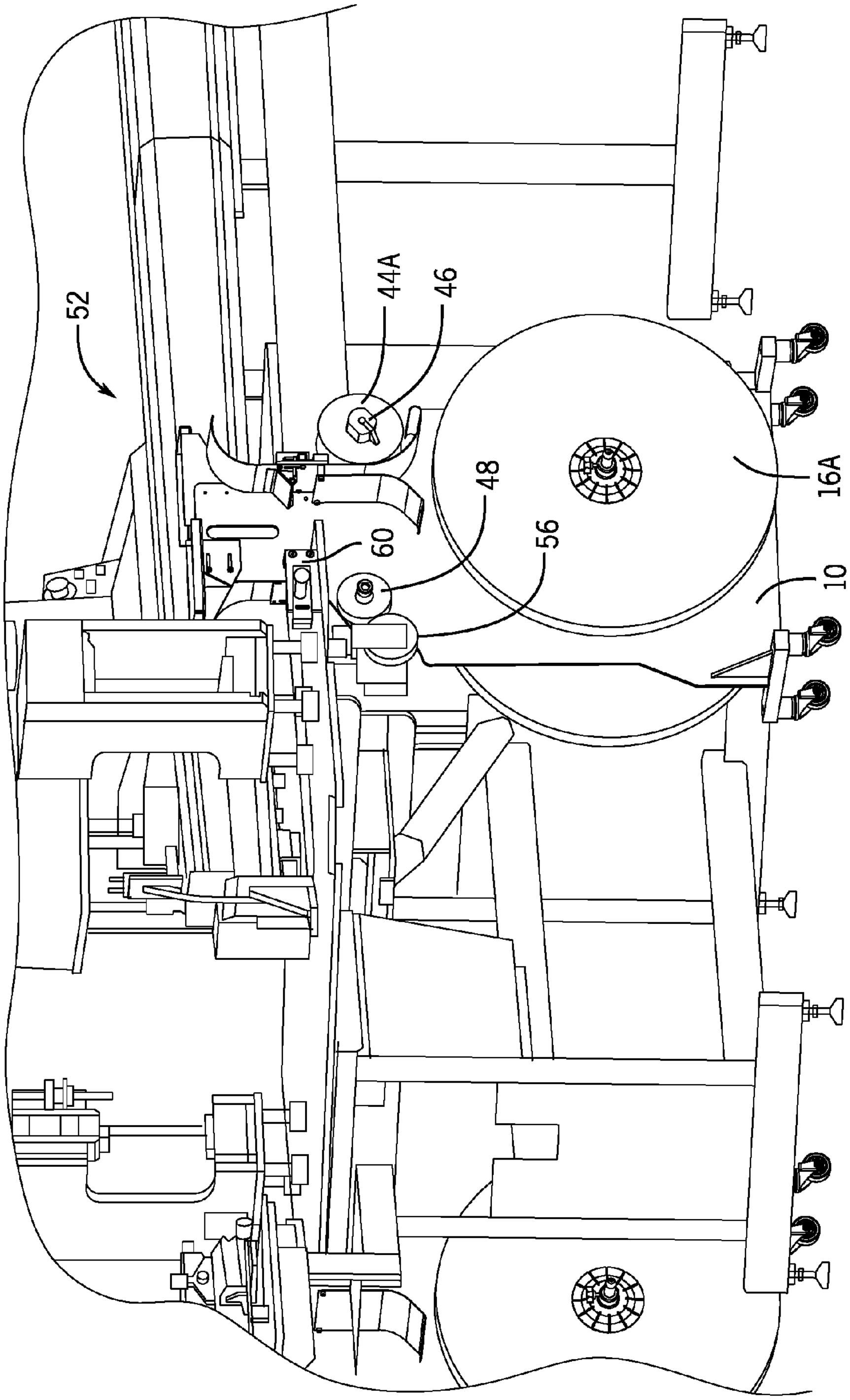
FIG. 7 is a perspective view showing the terminal reel cart installed within a wire processing system.

Referring back to FIGS. 1 and 2, the terminal reel cart 10 includes a locking bracket 60 mounted to each of the face surfaces 22A, 22B of the support body 12. The locking bracket 60 is used to securely couple the terminal reel cart 10 to the wire processing system 52, as can be seen in FIG. 7. The locking bracket 60 is shown to include an attachment slot 62 as an exemplary structure to facilitate coupling the terminal reel cart 10 to the wire processing system 52.

As stated previously, FIGS. 7-9 illustrate the position of the terminal reel cart 10 relative to the wire processing system 52. When the terminal reel cart 10 is positioned as shown, interaction between the drive wheel 50 and the drive wheel 48 causes the drive wheel 48 to rotate the paper take-up reel 44A to collect paper separator strip 3 of the terminal reel, as described. Once the terminal reel 16A, 16B has been emptied, the cart can be removed, rotated 180° on its caster wheels 14, and reinstalled with another terminal applicator 6 with the strip of terminals 2 already installed. The embodiment of the drawing Figures allows two separate terminal reels 16A, 16B to be positioned within the wire processing system for easy replacement as desired.

Figure 12:
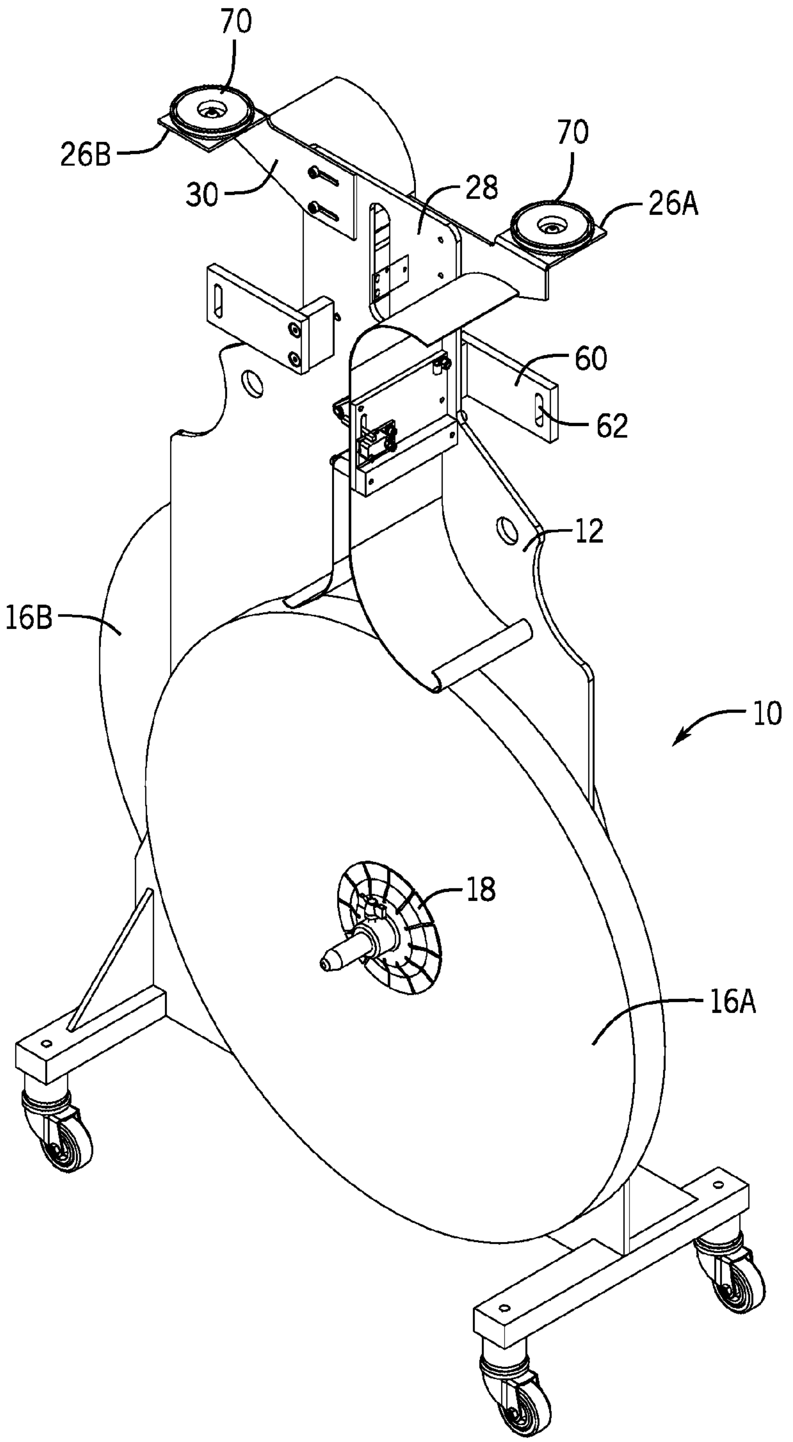
FIG. 12 is a front perspective view of a terminal reel cart similar to FIG. 1.

FIG. 12 illustrates an alternate embodiment in which each of the applicator holders 26A, 26B includes a permanent magnet mounting member 70. The permanent magnet mounting member 70 is attached to the support bracket 30 and is used to secure one of the terminal applicators 6 in the transport and storage position. The terminal applicators can be removed when desired and installed in the application system described previously.

It should be recognized that while the Figures generally depict a terminal reel cart 10 that supports two independent terminal applicator and terminal reel setups, the present disclosure can readily be expanded to include additional surfaces and corresponding terminal applicators. For example, a triangular support body having three face surfaces could be used to provide a terminal reel cart 10 having three terminal applicator and terminal reel setups.

The invention claimed is:

1. A terminal reel cart for minimizing the downtime of loading a wire processing system by having a first side and a second side of alternating terminal applicator systems, comprising:

a support body having a plurality of wheels;

a first support shaft extending from the support body and configured to rotatably support a first terminal reel;

a second support shaft extending from the support body and configured to rotatably support a second terminal reel;

a first terminal applicator mount extending from the support body to support a first terminal applicator;

a second terminal applicator mount extending from the support body to support a second terminal applicator;

a first paper take-up reel shaft extending from the support body to rotatably support a first paper take-up reel;

a second paper take-up reel shaft extending from the support body to rotatably support a second paper take-up reel;

a first terminal guide supported by the support body and positioned to guide a first continuous strip of terminals on the first terminal reel towards the first terminal applicator; and a second terminal guide supported by the support body and positioned to guide a second continuous strip of terminals on the second terminal reel towards the second terminal applicator;

whereby the first terminal reel, first terminal applicator, first paper take-up reel shaft, and the first terminal guide are accessible when the second side of the terminal reel cart is positioned to load and run the wire processing system, and the second terminal reel, second terminal applicator, second paper take-up reel shaft, and the second terminal guide are accessible when the first side of the terminal reel cart is positioned to load and run the wire processing system.

2. The terminal reel cart of claim 1, wherein accessing the first side does not interfere with the operation of the wire processing system when the second side is positioned to load the wire processing system.

3. The terminal reel cart of claim 2, wherein the first terminal reel and the first terminal applicator can be replaced with a third terminal reel and a third terminal applicator and a third continuous strip of terminals on the third terminal reel can be loaded into the third terminal applicator to pre-load the third terminal applicator on the first side while the second terminal applicator system on the second side is in operation with the wire processing system.

4. The terminal reel cart of claim 1, wherein the first terminal guide further comprises a first switch that alternates between an empty state and a non-empty state based on the presence of the first continuous strip of terminals within the first terminal guide, whereby the switch being in an empty state indicates that the first continuous strip of terminals has been depleted from the first terminal reel.

5. The terminal reel cart of claim 1, wherein the first and second terminal applicator mounts are a tray having a plurality of walls that retain one of the first and second terminal applicators.

6. The terminal reel cart of claim 1, wherein the first and second terminal applicator mounts include a permanent magnet that magnetically retains one of the first and second terminal applicators.

7. The terminal reel cart of claim 1, wherein the first and second terminal applicator mounts include an applicator baseplate to retain one of the first and second terminal applicators.

8. The terminal reel cart of claim 1, further comprising a first locking bracket and a second locking bracket supported by the support body, wherein the first locking bracket couples the terminal reel cart to the wire processing system when the first side of the terminal reel cart is positioned to load and run the wire processing system and the second locking bracket couples the terminal reel cart to the wire processing system when the second side of the terminal reel cart is positioned to load and run the wire processing system.

* * * * *